United States Patent [19]
Saito

[11] Patent Number: 5,729,288
[45] Date of Patent: Mar. 17, 1998

[54] ELECTRONIC IMAGE PICK UP APPARATUS EMPLOYING A COMPARISON TECHNIQUE FOR REDUCING THE EFFECT OF NOISE ON THE IMAGE

[75] Inventor: Kuniaki Saito, Tokorozawa, Japan

[73] Assignee: Olympus Optical Co., Ltd., Tokyo, Japan

[21] Appl. No.: 510,105

[22] Filed: Aug. 1, 1995

[30] Foreign Application Priority Data

Aug. 3, 1994 [JP] Japan .................... 6-182667

[51] Int. Cl.$^6$ ........................................... H04N 9/64
[52] U.S. Cl. ........................................ 348/243; 348/362
[58] Field of Search ........................ 348/241, 243, 348/244, 245, 248, 249, 207, 220, 362, 302, 308; H04N 9/64

[56] References Cited

U.S. PATENT DOCUMENTS 5,153,732  10/1992  Oda et al. ................. 348/243
5,216,511   6/1993  Tani ........................... 348/243
5,459,508  10/1995  Fukushima ............... 348/243

*Primary Examiner*—Thai Tran
*Assistant Examiner*—Tuan V. Ho
*Attorney, Agent, or Firm*—Louis Weinstein

[57] ABSTRACT

An electronic image pickup apparatus comprising a focal plane shutter for controlling reception or cut-off of the light from an object, a CMD, image pickup device as a MOS-type internal amplification sensor, RGB channel process circuits for processing RGB outputs from the CMD, and a system controller for controlling the entire apparatus. The focal plane shutter lets in the light from the object to photograph for exposure. The resulting image data is temporarily stored in a memory. With no light from the object projected onto the CMD, a dark exposure is performed for the same time as the exposure to extract a signal corresponding to dark current. Reading the image data from the memory and reading the data at the dark exposure are performed at the same time. The dark current component is removed by subtracting the dark exposure data from the image data.

25 Claims, 10 Drawing Sheets

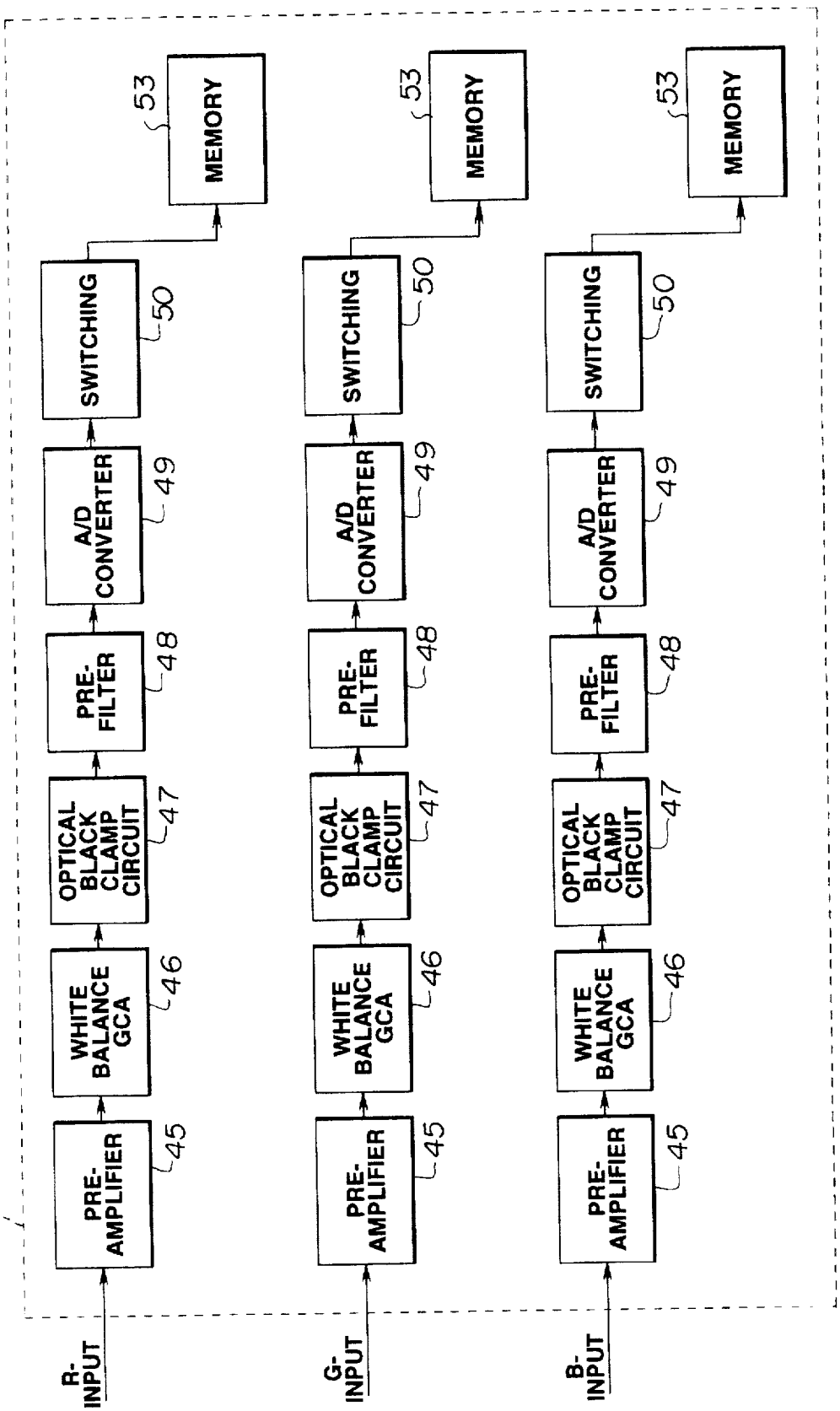

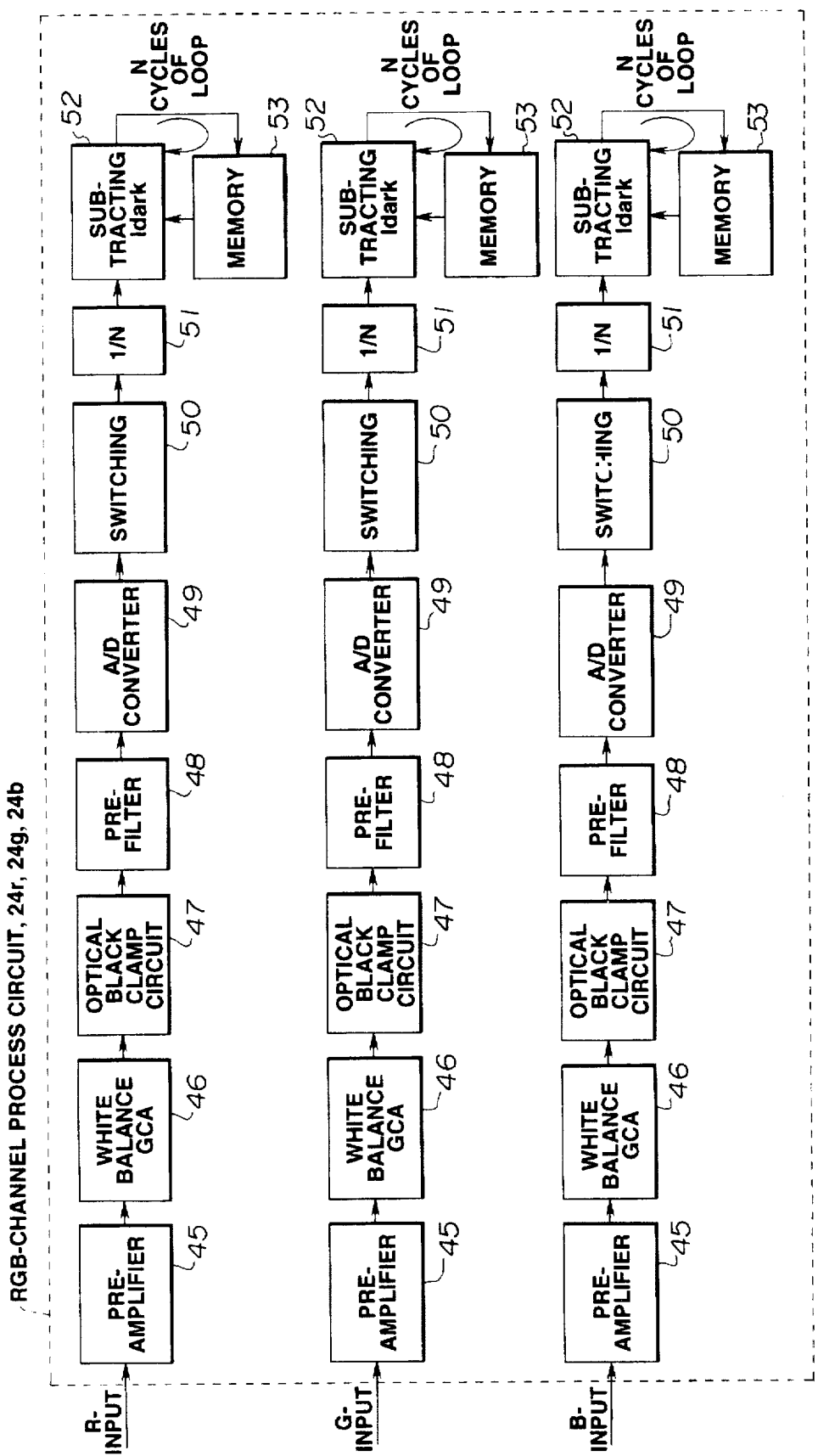

ELECTRONIC IMAGE PICK UP APPARATUS EMPLOYING A COMPARISON TECHNIQUE FOR REDUCING THE EFFECT OF NOISE ON THE IMAGE

BACKGROUND OF THE INVENTION

1. Field of the Invention

The present invention relates to an electronic image pickup apparatus, and in particular to an electronic image pickup apparatus that picks up the image of an object by means of an image pickup device.

2. Related Art Statement

Image pickup devices, such as CCDs, which have conventionally been used in an electronic image pickup apparatus, generate a current even when they receive no light. One of the major causes for such a current is a so-called dark current.

The dark current is attributed to electron-hole pairs which take place when the semiconductor is thermally excited. The electron-hole pairs are caused due to a diversity of defects. Electron-hole pairs are generated in a different manner from device to device, and give rise to fixed pattern noise. This restricts the sensitivity and dynamic range of the image pickup device.

The dark current increases its magnitude as the storage time for light signal charge is prolonged. Furthermore, the dark current is largely dependent on temperature. As for temperature dependency, for example, a temperature rise of 8° to 10° C. doubles the magnitude of the dark current.

To alleviate the dark current, some prior art image pickup devices are provided with an optical back portion that works as a light-cutting mask portion. The image pickup device obtains a pickup sensor output from its exposure portion while receiving an output from the optical back portion, and compares both outputs to clamp a black level to the light-cutting mask portion output.

In the above prior art, it is possible make compensations, including the effect of temperature rise, to both screened cells and exposed cells that have the dark current characteristics identical to those of the screened cells. However, the prior art cannot compensate for fixed pattern noise and variations in temperature characteristic of dark current of the individual cells.

The following method is contemplated to eliminate a fixed pattern noise. A fixed pattern noise repeatedly appears on the same cell at the same location in an image pickup device. A ROM is designed to store data corresponding to the dark current that takes place when the noise appears on the same cell and then the stored dark current data is subtracted from image data when it is read.

In such cells having a fixed pattern noise, dark current is also dependent on temperature. To compensate for a change in the ambient temperature, the above method needs a temperature sensor, and the eve of dark current by predetermined temperature band is stored in a ROM. From these stored data, the dark current eve matched to a detected temperature must be computed. Such an operation is complex and no accurate compensation is practicable.

The dark current is cumulative with time, and is thus dependent on the electrical charge dwell time which varies depending on an exposure time, and the read time for each cell as well. Another particular compensation process may be required if the apparatus has a variable exposure time capability or if the apparatus has the cells, each having a different dwell time, which is more noticeable when transfer time is prolonged in serial cell output.

To compensate for the dark current appropriately, the dark current should be removed from the output signal on an individual cell basis, and a compensation process should be performed in response to changes in temperature, exposure time and transfer time. Any practical method, which allows such a process to be implemented into an actual system, remains to be proposed.

SUMMARY OF THE INVENTION

The present invention comprises an image pickup device, light-cutting mask means for controlling light from an object to the image pickup device so as to let the light in or cut the light off, memory means for temporarily storing the output image data from the image pickup device, and computing and control means which determines an optimum exposure setting appropriate for photographing and which derives final image data by subjecting to computation both first and second image data after making both the first and second image data on each cell match in time using the memory means where the first image data corresponds to the output signal that is read from the image pickup device after photographing and the second image data corresponds to the dark output signal that is read from the image pickup device when it is masked.

According to an aspect of the present invention, the electronic image pickup apparatus comprises an image pickup device, light-cutting mask means for controlling light from an object to the image pickup device so as to let the light in or cut the light off, memory means for temporarily storing the output image data from said image pickup device, and computing and control means for determining an optimum exposure setting appropriate for photographing, and in connection with first image data corresponding to the output signal that is read from said image pickup device after photographing and second image data corresponding to the output signal that is read from said image pickup device during light cutoff, said computing and control means deriving final image data by subjecting to computation both said first and second image data, after making both said first and second image data on each cell match in time using said memory means.

According to another aspect of the present invention, said image pickup device is a two-dimensional sensor.

According to still another aspect of the present invention, said two-dimensional sensor is an MOS-type internal amplification sensor.

According to still another aspect of the present invention, said memory means stores the first image data photographed at a first timing intended by an operator, and in connection with the second image data read from said image pickup device at a second timing during light cutoff and third image data that is the first image data stored in and then read from said memory means, said computing and control means comprises subtracting means that assures time match between both the second and third data and subtracting the second image data from the third image data at a third timing.

According to still another aspect of the present invention, said computing and control means causes the memory means to temporarily store an image data that is photographed at a first timing during light cutoff with the light-cutting mask means cutting off light, said image data obtained for a duration of time that has a predetermined relation with the effective exposure time derived from a photometric measurement made in advance, said computing and control means obtains the light-permitted image data that is photographed at a second timing during light reception with the exposure time set to be in agreement with said duration and other exposure setting being appropriate, and said computing and control means comprises subtracting means that assures time match between the image data during light reception and the data that is once stored in and read from said memory means and subtracts the read image data from the image data during light reception.

According to still another aspect of the present invention, the light-cutting mask means is a mechanical exposure control shutter.

According to still another aspect of the present invention, said mechanical exposure control shutter is a between lens shutter that performs lens aperture action.

According to still another aspect of the present invention, said mechanical exposure control shutter is a focal plane shutter.

According to still another aspect of the present invention, said light-cutting mask means is a movable optical mirror that reflects the light thereto from an object toward a finder system.

According to still another aspect of the present invention, said computing and control means is so constructed that a timing control and routine control to derive the first image data from the corresponding output signal of said image pickup device during light cutoff are set to be in agreement with a timing control and routine control to derive the second image data from the corresponding output signal of said image pickup device during light reception.

According to still another aspect of the present invention, said computing and control means comprises second memory means for storing a data representing a time duration for a photoelectric conversion of said image pickup device during light reception, whereby said timing control and routine control during light cutoff are performed based on the stored data in said second memory means.

According to still another aspect of the present invention, the image data that is obtained through subtraction operation is written onto the same memory means.

According to still another aspect of the present invention, said computing and control means is so constructed that, by issuing a transfer request command to an external device connected therewith, reads the output image data to be transferred to said external device from the memory means at a transfer rate slower than the mentioned output rate of said image pickup device.

According to still another aspect of the present invention, said computing and control means reads the output signal from the image pickup device during light cutoff on N cycles where (N is a natural number), stores the data corresponding to the output signal at each cycle in the memory means, averages N sets of data, and uses the average value as the image data during light cutoff, whereby a random noise component contained in the output signal read during light cutoff is reduced.

According to still another aspect of the present invention, said computing and control means is provided with dividing means that divides the value of the image output data during light cutoff to 1/N where (N is a natural number), whereby, in connection with a process cycle starting with reading at the first timing the image data stored in the memory means, then subtracting from the read data the divided data given by the dividing means, and ending with writing back the result from the subtraction onto the memory means, the image output data is sequentially obtained from the output signal of the image pickup device on N cycles during light cutoff, the resulting N sets of data are subjected to N process cycles and the result is the final image data of reduction for random noise component contained in the read out signal during light cutoff.

According to still another aspect of the present invention, said N is a power of 2, whereby division operation of the dividing means is performed by bit shifting.

According to still another aspect of the present invention, said electronic image pickup apparatus comprises a movable optical mirror for routing light to a finder system, disposed in the optical path along which light from the object passes a taking lens and reaches the image pickup device, control means for switching the optical path of the light from the object, from the one leading to the finder system to the other leading to the image pickup device, in response to a photographing trigger signal, a focal plane shutter with exposure control capability disposed in the optical path in front of the image pickup device, photometric means for making photometric measurements to the light coming in through the taking lens from the object, in order to determine optical aperture value and the shutter speed of the focal plane shutter, and a white diffuser having a predetermined transmittance, mountable in the optical path between the optical mirror and the focal plane shutter, whereby the amplification factor to an output signal of said image pickup device is determined and set thereto, prior to photographing, according to the aperture determined based on the output from the photometric means and the output level of the image pickup device that is exposed to the light transmitted through the white diffuser, and then photographing is performed under a condition of said amplification factor applied to the output.

According to still another aspect of the present invention, in the course of converting the incident light of RGB spectral characteristics by said image pickup devices into electrical signals, the exposure setting is determined after a commencement of a photographing trigger signal, the white diffuser is put into the optical path, the amplification factor of the circuitry of the apparatus is determined and set thereto so that the output levels of the R-channel, G-channel and B-channel are equalized at level, and then photographing is then performed under a condition of said amplification factor applied to the R, G and B outputs.

According to still another aspect of the present invention, both the optical mirror and the white diffuser are mounted between the taking lens and said image pickup device in a manner that allows both the optical mirror and the white diffuser to be able to pivot up and down and the orbit of pivotal motion of the optical mirror is partly superimposed in space on the orbit of pivotal motion of the white diffuser, and further provided is second control means which control sequentially three states, namely, a first state in which the optical mirror guides the light from the object to the finder system, a second state in which the light transmitted through the white diffuser is guided to the image pickup device, and a third state in which both the optical mirror and the white diffuser are retracted to allow the light from the object to be guided directly to the image pickup device.

According to still another aspect of the present invention, guiding of the light coming in through the taking lens from the object to the finder system via the optical mirror is disabled from a commencement of photographing until said final image data is derived from said computing and control means or until at least one cycle of data transfer from the memory means is completed.

According to still another aspect of the present invention, the image data is extracted after said amplification factor of each circuit of the channel is determined so that the outputs of the R-channel, G-channel, and B-channel are equalized at level.

These as well as other objects and advantages of the present invention will become further apparent from the following detailed explanation.

BRIEF DESCRIPTION OF THE DRAWINGS

FIG. 5 is a block diagram showing a portion of the process circuit of FIG. 2, involved in an exposure data memory mode.

FIG. 6 is a block diagram showing a portion of the process circuit of FIG. 2, involved in a dark signal subtracting mode.

DETAILED DESCRIPTION OF THE PREFERRED EMBODIMENT

Figure 1:
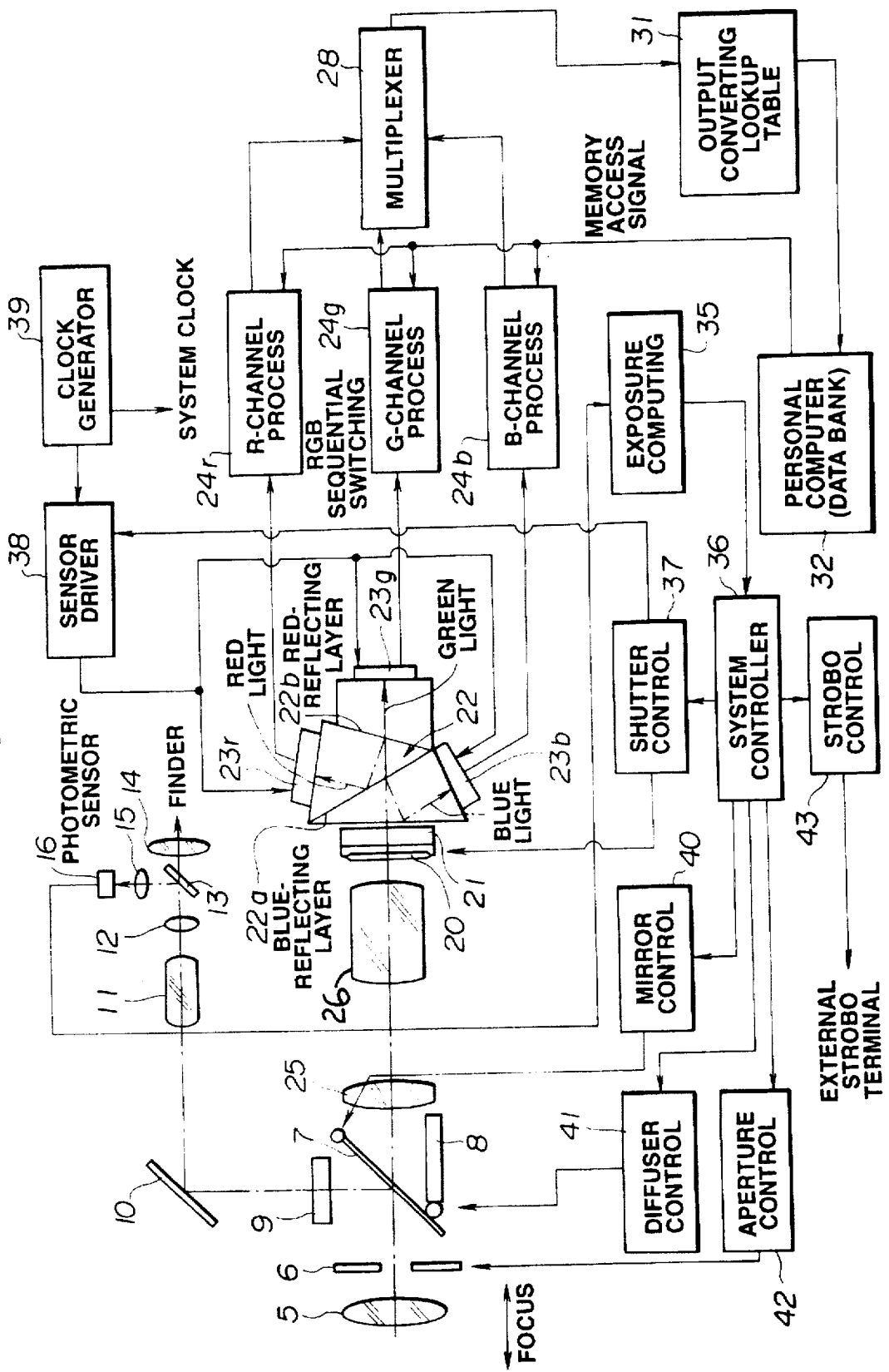
FIG. 1 is a block diagram showing the camera system according to an embodiment of the present invention.

Referring now to the drawings, the embodiment of the present invention is now discussed.

FIGS. 1 through 11 show the embodiment of the present invention. FIG. 1 is the block diagram showing generally the camera system as the electronic image pickup apparatus of the embodiment.

Light flux from an object entering through a taking lens 5 passes through an aperture 6 and reaches a quick return mirror 7 behind it.

The quick return mirror 7 is arranged so that its upward-looking reflecting surface is inclined at an angle of approximately 45° with respect to its optical path. In this setting, the image of the object is guided to a finder system. The quick return mirror 7 is pivotally supported about its axis of rotation. When it is flipped up about its axis rotation, the quick return mirror 7 allows the incoming light flux to pass therethrough toward the image pickup device.

Disposed just below the quick return mirror 7 is a white diffuser 8 for achieving white balance. In this embodiment, the white diffuser 8 is pivotally supported about its axis of rotation so that it is placed in the optical path as necessary.

The orbit of pivotal motion of the quick return mirror 7 is partly superimposed on the orbit of pivotal motion of the white diffuser 8. Namely, both partly share some common space for their motion.

A screen mat 9 for imaging the object is disposed on the finder optical path of the light upwardly reflected off the quick return mirror 7. The screen mat 9 and a field lens 25 are positioned at optically equivalent locations with respect to the taking lens 5.

The image of the object formed by the screen mat 9 is reflected off a mirror 10 is directed to an eyepiece 14 via a relay lens 11 and a field lens 12 so that the image may be observed through the finder.

Disposed between the field lens 12 and the eyepiece 14 is a half mirror 13 which picks up and directs part of the light flux for the finder via a lens 15 to a photometric sensor 16 which measures light level of the object. These components constitute a TTL photometric finder optical system.

During normal photographing, the quick return mirror 7 is flipped up.

Arranged along the photographing optical path are the field lens 25 for imaging the object, a reduction optical system 26 for reducing again and then relaying the image to the image pickup device (CMD in this embodiment), and a focal plane shutter 20 as light-cutting mask means. The focal plane shutter 20 is identical to the one used in the ordinary single lens reflex camera.

Disposed behind the focal plane shutter 20 is an optical member 21 such as a ¼λ plate or an infrared filter.

A dichroic prism 22 is disposed behind the optical member 21. When light enters the dichroic prism 22, it reflects blue-wavelength light (B) only by its blue-reflecting layer 22a to send it to a B-channel CMD 23b as the image pickup device. The light, the blue component of which is removed by the blue-reflecting layer 22a, is then subjected to a red-reflecting layer 22b which reflects red-wavelength light (R) to send it to an R-channel CMD 23r as the image pickup device. The rest, green-wavelength light (G), is directed to a G-channel CMD 23g as the image pickup device.

The dichroic prism 22 thus separates the incoming light from the object into red (R), blue (B) and green (G) wavelength lights, and allows each of three CMDs 23b, 23r, and 23g to image the object.

The image on each of CMDs 23b, 23r and 23g is photoelectrically converted into R, G and B signals, which are then input to computing means, namely, an R-channel process circuit 24r, a G-channel process circuit 24g, and a B-channel process circuit 24b, respectively. As described later with reference to FIG. 2, RGB signals are processed in parallel.

The outputs from the R-channel process circuit 24r, B-channel process circuit 24b, and G-channel process circuit 24g are sent to a multiplexer 28, where the outputs are multiplexed.

The multiplexer 28 reads data from the memories in the sequential order of R, G and B, and sends the data via a serial interface to a personal computer 32 that also works as a data bank. When receiving the data, the personal computer 32 issues a memory access signal to each of the R-, G-, and B-channel process circuits 24r, 24g, and 24b.

When output conversion is performed, a lookup table 31 receives an input voltage linearly proportional to the input light level. Referring to the lookup table 31 for output conversion, the tone of light is modified.

The camera system is provided with a system controller 36 which controls the entire system.

The output of the photometric sensor 16 is sent via an exposure computing circuit 35 to the system controller 36, which in turn monitors the exposure condition of the object when it is photographed.

Based on the photometric data, the system controller 36 makes a determination of whether a flash of a stroboscope is needed or not. When the flashing of the stroboscope is needed, the system controller 36 causes a strobo control circuit 43 to trigger the stroboscope via an external strobo terminal.

Furthermore, the system controller 36 determines an exposure setting based on the photometric data, controls an aperture 6 through an aperture control circuit 42, controls the timing of insertion of the white diffuser 8 through a diffuser control circuit 41, and controls the timing of driving of the quick return mirror 7 through a mirror control circuit 40.

The system controller 36 also controls the focal plane shutter 20 through a shutter control circuit 37. Furthermore, the system controller 36 controls CMDs 23r, 23g and 23b through a sensor driver circuit 38, because CMDs 23r, 23g and 23b also need exposure control.

Specifically, the sensor driver circuit 38 for driving CMDs 23r, 23g and 23b receives a required pulse signal as its original signal from the clock generator 39. The sensor driver circuit 38 is controlled to be in synchronism with the clock of the system controller 36, which feeds exposure time information back to the sensor driver circuit 38.

Figure 2:
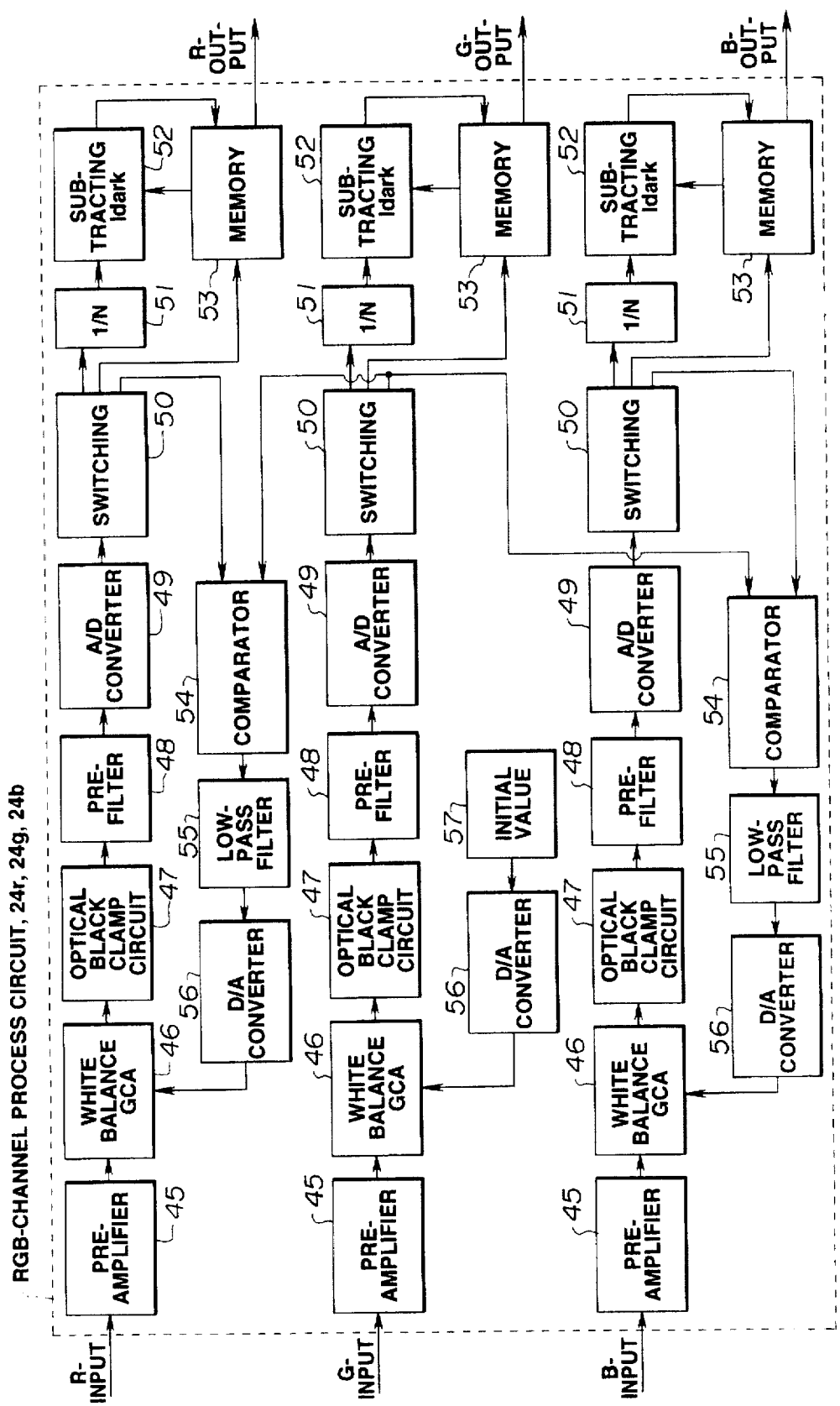
FIG. 2 is a block diagram showing in detail the process circuit of the above embodiment.

Referring to FIG. 2, RGB channel process circuits 24r, 24g and 24b are now discussed in detail.

The RGB channel CMDs 23r, 23g, and 23b feed RGB channel outputs to the RGB channel process circuits 24r, 24g, and 24b, in parallel and separately, and thus circuits for processing channel signals are separately provided.

Now, one of the three color channels is discussed. An input signal is first amplified by a preamplifier 45 which has a predetermined amplification factor, and then fed to a white balance gain control amplifier (white balance GCA) 46 where gain control for white balance is performed.

The white balance GCA 46 is adjusted for a proper amplification factor so that resulting RGB signals are equalized at their level.

The output signal from the white balance GCA 46 is then sent to an optical black clamp circuit 47, where the optically black portion of the output signal is clamped so that representative portions of the cells are compensated for temperature-dependent dark current characteristics.

The output signal from the optical black clamp circuit 47 is first fed to a prefilter 48 which limits the frequency band to prevent aliasing arising from analog-to-digital conversion, and is fed to an A/D converter 49 to be converted into a digital signal. The digital signal is fed to a switching circuit 50 which provides selectively three outputs.

One of the three outputs from the switching circuit 50 is fed to a 1/N circuit 51 which divides the input signal by N, and is then fed to an Idark subtracting circuit 52 for removing dark current (Idark). The Idark subtracting circuit 52 removes the dark current component in cooperation with a memory 53 serving as memory means.

The memory 53 receives another output of the switching circuit 50.

The last output of the switching circuit 50 is fed to a comparator 54, then to a low-pass filter 55 and a D/A converter 56 where the signal is converted into an analog signal. The analog signal is used to control a voltage to the white balance GCA 46 to vary its gain.

In the G-channel, an initial value setting means 57 feeds an input to the D/A converter 56.

The three outputs from the switching circuit 50 corresponds to a white balance mode, an exposure data memory mode, and a dark current subtracting mode. Discussed next in detail is a series of operational sequences in which control is performed by switching from one mode to another.

Figure 3:
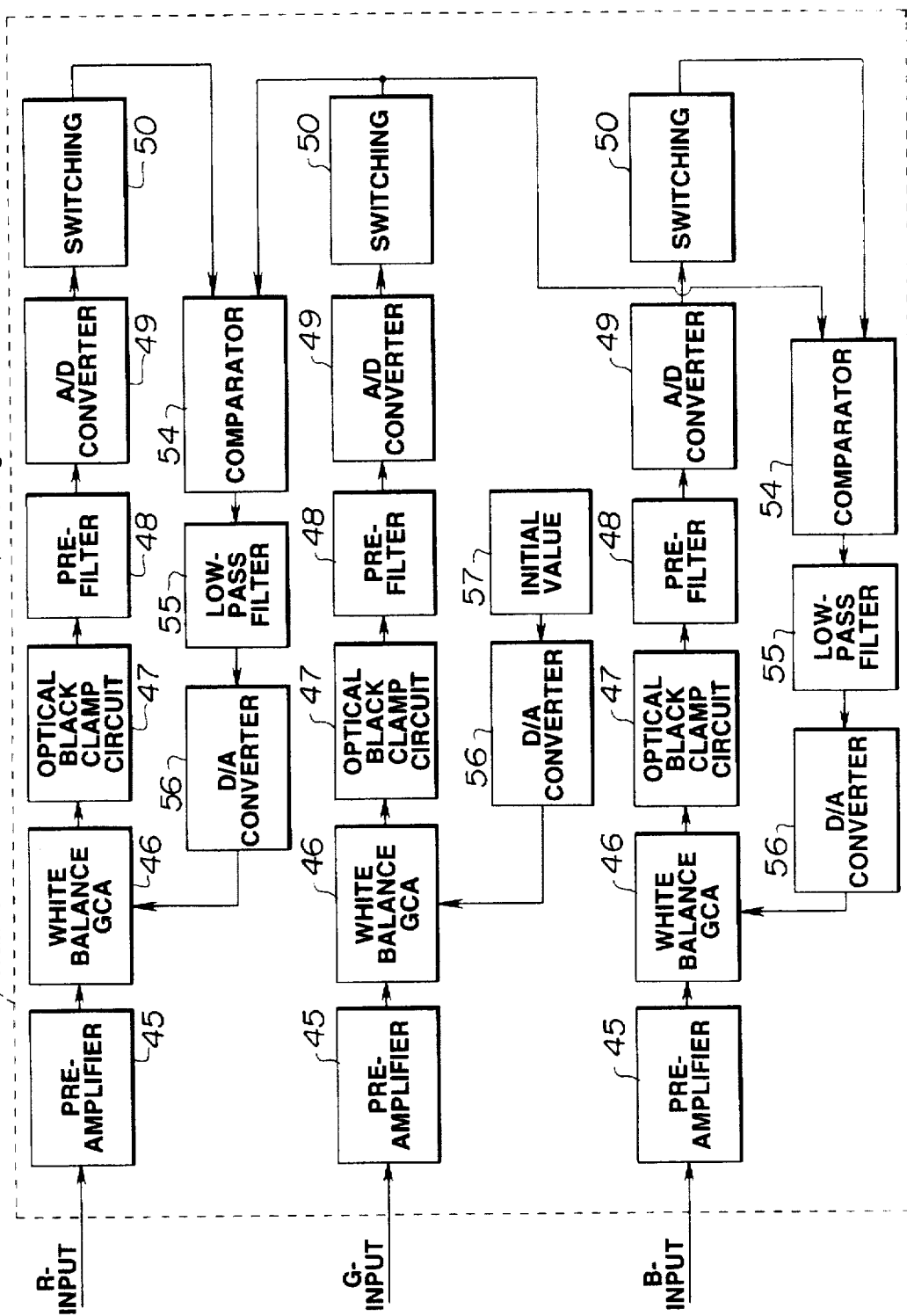
FIG. 3 is a block diagram showing a portion of the process circuit of FIG. 2, involved in white balance mode.

When an unshown shutter release or photographing trigger button is pressed, the photometric sensor 16 makes photometric measurements of the object. The system is then put into the white balance mode. The white diffuser 8 is inserted in the optical path. The white balance mode is now discussed referring to FIG. 3. FIG. 3 shows only the portion involved in the white balance mode with the remaining portion for other modes omitted.

R and B inputs on R- and B-channels are subjected to a series of processings by respective preamplifier 45, white balance GCA 46, optical black clamp circuit 47, prefilter 48, A/D converter 49, and switching circuit 50. The respective switching circuit 50 gives output data.

The G-channel is provided with the initial value setting means 57 as already described. The D/A converter 56 converts the output signal of the initial value setting means 57 into an analog signal, which is then input to the white balance GCA 46 to provide gain control at a fixed value.

The purpose of the white balance mode is to equalize final RGB outputs at level by adjusting the R-channel and B-channel outputs to the reference which is the G-channel output level determined by the output of the initial value setting means 57.

Both the constant output of the G-channel switching circuit 50 and the output of the R-channel switching circuit 50 are fed to the comparator 54, which determines which is larger. A difference between the G-channel output and the R-channel output is detected when the output signals originally suffer from loss of white balance.

The output of the comparator 54 is sent to a low-pass filter 55, and then fed to the D/A converter 56 from which an analog signal is output. The analog signal, as a gain compensation signal, is fed back to the white balance CGA 46.

In the initial phase of white balance mode, the agreement in RGB outputs is not yet reached because of time lag and transient variations in the circuitry. Finally, the RGB outputs converge to agree with each other precisely.

In the white balance mode, the white diffuser 8 is inserted and the entire field is white. Even with some degree of drop in light quantity around the margin of lenses, the relationship of R=G=B is maintained in any location of interest and thus this relative ratio remains unchanged. The values of cells may change with time, but no problem is presented in the adjustment of white balance.

In the same manner, the gain of CGA 46 is adjusted by comparing the B-channel output to the G-channel output. Finally, white balance is achieved so that both the R-channel output and the B-channel output agree with the G-channel output.

The above-described sequence, performed in the shutter release operation, is the white balance mode for achieving white balance in succession to photometric measurement.

Figure 4:
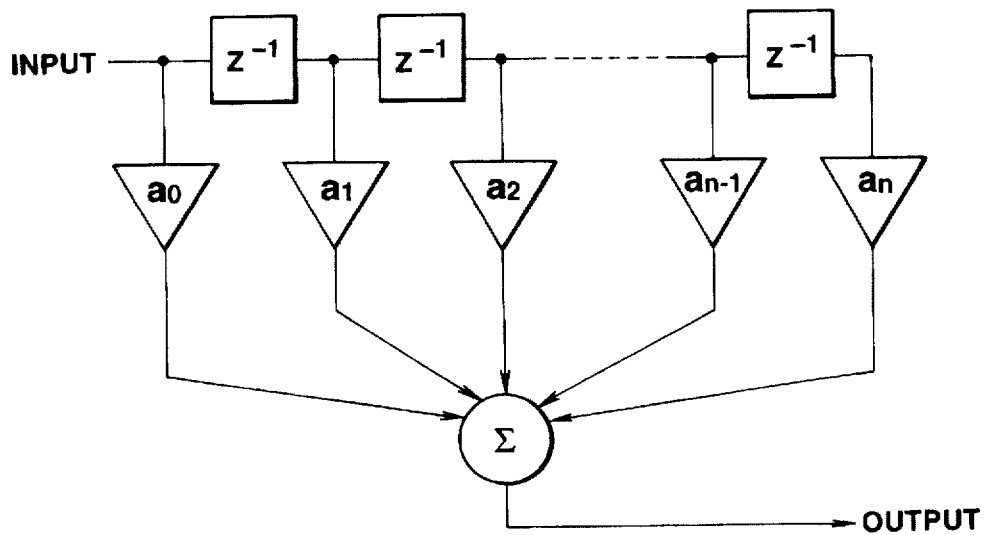
FIG. 4 is a block diagram showing an example of the construction of the low-pass filter of the above embodiment.

FIG. 4 shows an example of the construction of the low-pass filter 55.

The output of each of the RGB channels may contain noise inherent to each circuit or random noise. Such noise may influence the required signal even after the comparator 54.

At any given time, the low-pass filter 55 gives each tapped output a predetermined delay time $Z^{-1}$ relative to its input, multiplies the tapped outputs by coefficients a0, a1, a2, . . . , an, respectively, and sums them.

This filter is called a non-cyclic digital filter. As the low-pass filter 55, this type of filter may be used to allow the signal to converge in a reliable manner.

FIG. 5 shows the exposure data memory mode.

In the exposure data memory mode, the memory 53 stores data taken in normal photographing with the focal plane shutter 20 opened.

At the timing of exposure to the object, the switching circuit 50 is switched to the memory mode. The exposure data output from the switching circuit 50, as it is, is written onto the memory 53.

The system is then put into the dark current subtracting mode. In the dark current subtracting mode, the image pickup device accumulates dark current with the focal plane shutter 20 closed, and the resulting dark current data is subtracted from the image data stored in the exposure data memory mode to remove dark current noise component.

In the dark current subtracting mode, as shown in FIG. 6, the Idark subtracting circuit 52 receives both the data read from the memory 53 that has stored the real exposure data in the exposure data memory mode and the output signal of the switching circuit 50 after it is divided by N through the 1/N circuit 51.

The Idark subtracting circuit 52 subtracts one from the other data with respect to the same cell of the same location within the image pickup device at a predetermined timing. The result of subtraction is returned back to the same memory location of the memory 53.

The input to the Idark subtracting circuit 52 is already a divided-by-N data where (N is a natural number). By repeating N cycles of the subtracting operation, the level as equal as the dark current component contained in the exposure data is thus subtracted. The result is stored in the memory 53.

The subtracting operation for removing the Idark current component is performed on each of the RGB channels.

Figure 7:
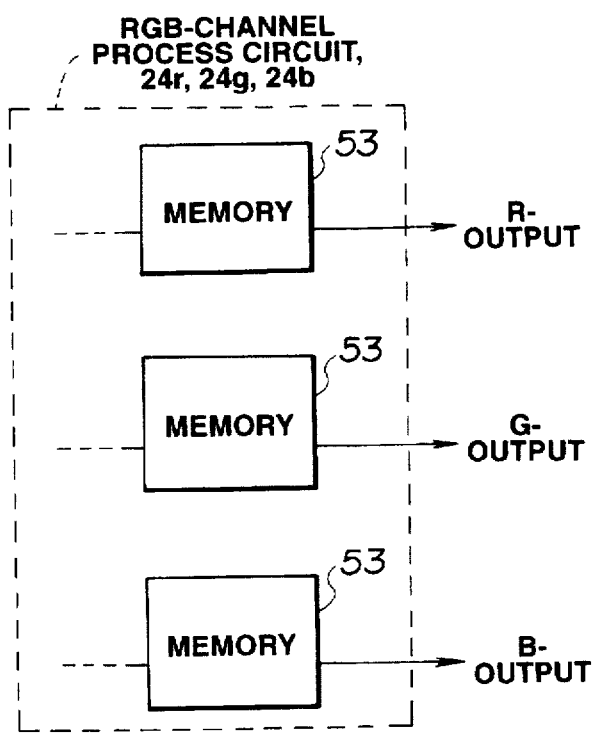
FIG. 7 is a block diagram showing outputs from the image pickup device of the above embodiment.

The RGB outputs from the memories 53 are independently output as shown in FIG. 7 to be transferred to an external medium or a monitor display.

Figure 8:
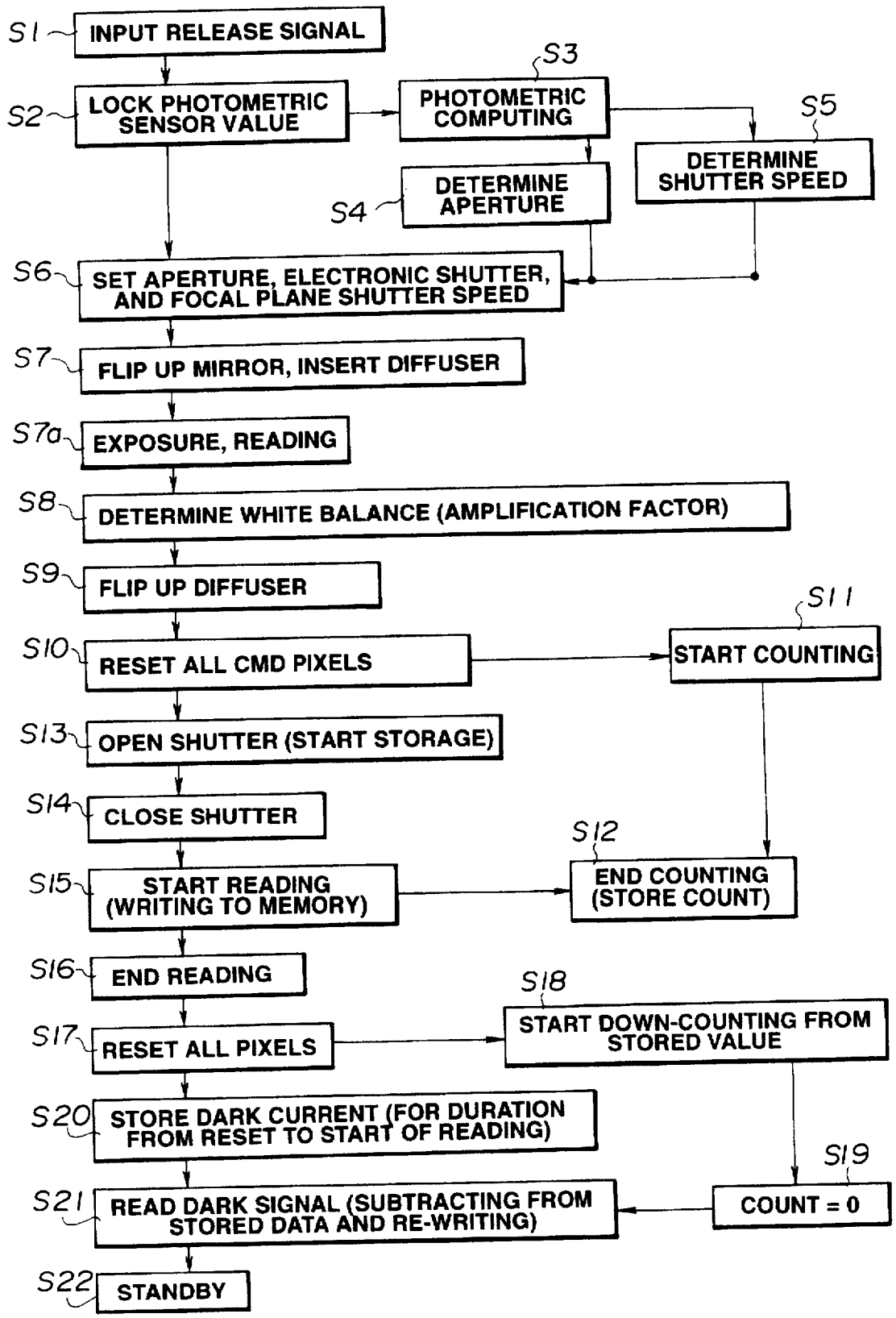
FIG. 8 is a flow diagram showing the operation of the camera system of the above embodiment.
Figure 9:
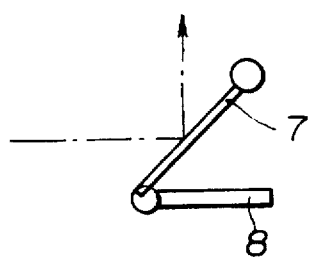
FIGS. 9A, 9B, and 9C are side views showing the operation of the quick return mirror and the white diffuser of the above embodiment.
Figure 9:
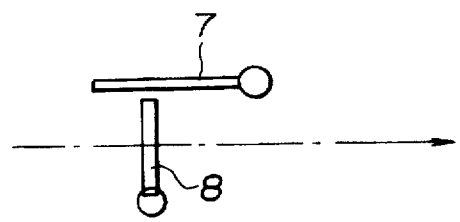
Figure 9:
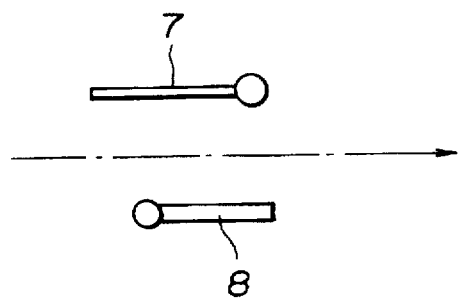
Figure 10:
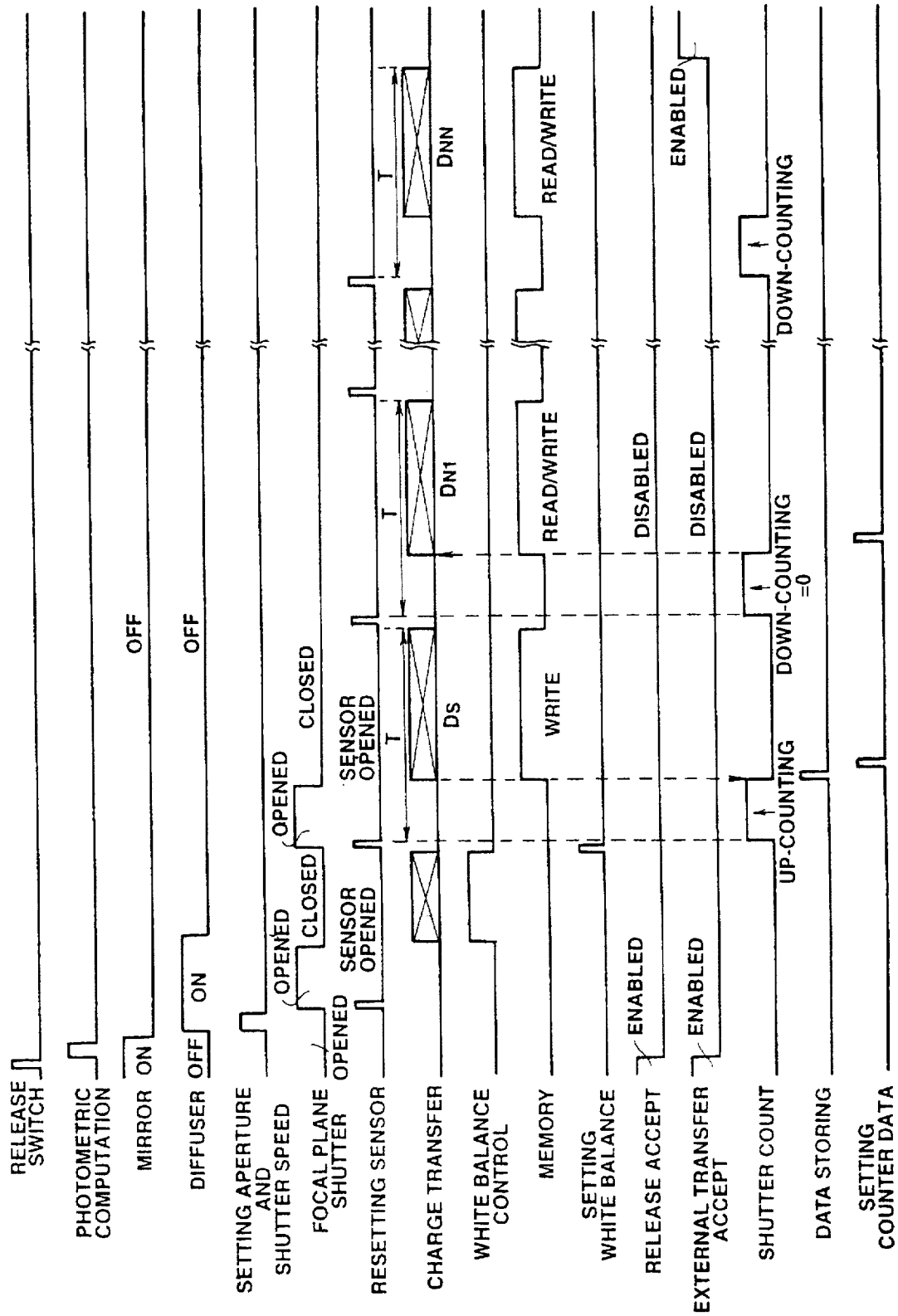
FIG. 10 is a timing diagram showing how output signals of the above embodiment are generated.

FIG. 8 is the flow diagram showing the operation of the camera system of the present invention. FIG. 10 shows a series of sequence starting from the pressing of the shutter release button and ending with the storing of the image data without the dark current component to the memories 53.

When the object is viewed through the finder system, the quick return mirror 7 is inserted into the photographing optical path as shown in FIG. 9A so that the light flux from the object is guided to the finder system disposed above the mirror 7.

In this state, the shutter release button may be pressed by an operator at will at any timing. A photographing trigger signal is generated (step S1), the value obtained by the photometric sensor 16 is locked (step S2), and photometric computation is performed based on the obtained value (step S3).

The photometric computation determines an aperture value and shutter speed (step S4, step S5). Based on these values, aperture, electronic shutter and focal plane shutter 20 speed are set (step S6). As shown in FIG. 9B, the quick return mirror 7 is flipped upward to let the photograph image in and the white diffuser 8 is inserted in the optical path (step S7). As seen from the timing diagram in FIG. 10, viewing the object through the finder system is allowed until the photometric computation is complete.

When the white diffuser 8 is placed in the optical path, the aperture 6 and the focal plane shutter 20 are driven according to the aperture value and shutter speed set by the photometric computation result.

The sensor (the image pickup device) is reset in synchronism with the motion of the focal plane shutter 20, initiating charge accumulation. The charge accumulation continues until a next reset.

The start timing of exposure may be either when the focal plane shutter 20 is opened or when the sensor is reset.

The exposure time by light transmitted through the white diffuser 8 is controlled according to the duration from opening to closing of the focal plane shutter 20, when the sensor is reset prior to the shutter operation. In the dark condition that follows with the focal plane shutter 20 closed, charge is transferred (step S7a).

When the focal plane shutter 20 is closed, the sensor output signal is read. In the course of reading, the already-described white balance mode is activated. The RGB channel outputs are converged to agree with each other and the amplification factor of each white balance GCA is determined (step S8).

The white balance mode remains continuously operative for convergence while charge transfer is performed. Immediately when reading all the cell data is complete, white balance is set up. The white balance now set remains fixed and effective until a next photographing.

With the white balance completed, the camera system is conditioned for further photographing sequence. As shown in FIG. 9C, the white diffuser 8 is flipped down (step S9) putting the system into the exposure sequence. Part of the exposure sequence from opening to closing of the focal plane shutter 20 repeats the operation of the white balance except that the white diffuser 8 is not in the optical path in the exposure sequence.

As already described, this embodiment uses a CMD, MOS-type internal amplification sensor, all cells are first reset (step S10).

Since from the reset of the sensor, the next cycle of accumulation is started, the reset of the sensor means the start of exposure of the sensor. In synchronism with the resetting, an unshown timer is activated for counting (step 11).

The exposure sequence is now initiated, opening the focal plane shutter 20 (step S13). When the shutter time determined in the exposure computation elapses, the focal plane shutter 20 is closed (step S14).

The reading (transfer) of charge accumulated in the image pickup device (this corresponds to Ds in FIG. 10) is initiated. At the same time, image data of each process circuit is sequentially written onto each memory 53 (step S15) (This sequence corresponds to the exposure data memory mode).

The start of reading terminates the counting of the timer initiated at step S11, and that count (corresponding to time T in FIG. 10) is stored (step S12).

As seen from FIG. 10, the time required to transfer charge is set to be longer than that in the white balance mode. Although the exposure sequence requires that charge be transferred from all the cells, white balance does not need full reading of all the cells. The quantity of data will be simply sufficient enough, if it serves the white balance purpose. Thus, the quantity of data read in white balance is set to be smaller.

When all the charge from the image pickup device is transferred with reading ended (step S16), the writing operation of the exposure data onto the memory 53 also ends.

All the cells in the image pickup device are thus reset (step S17), and at the same moment the timer starts down-counting the stored count (step S18).

Since the focal plane shutter 20 is then closed, no light from the object is let in to the image pickup device. The image pickup device thus starts accumulation of dark current (step S20).

When the count reaches 0 (step S19), the shutter time of the exposure sequence becomes equal to the accumulation time of dark current. The accumulation of dark current is then terminated, followed by reading of the dark current signal (step S21).

During read time $D_{N1}$, the exposure data is read from the memory 53, the data corresponding to the dark signal that is currently read from the image pickup device through the process circuit is subtracted from the exposure data, and the result is written back on the same address in the memory 53. This sequence is repeated for each cell at the timing of transfer from each cell.

When the focal plane shutter 20 is closed, signal reading is performed in dark condition as described above. Cell data contained in the initial portion of the transfer time is read early, but their counterpart contained in the later portion of the transfer time must wait some time before transfer. This means that the cell data contained in the later portion of the transfer time has an extra quantity of dark signal accumulated, compared to the initial cell data.

The dark signal level at any cell of interest is equalized regardless of a time difference in transfer by applying the same order of cell data reading and the same data transfer rate to both the charge transfer during exposure with light incoming and the charge transfer in dark condition.

It is important that the duration T is equalized in time between the exposure with light allowed and exposure with light cut off (this is referred to as dark exposure). To this end, the duration during which the focal plane shutter 20 is opened in the exposure is counted, and the resulting count is stored. In the dark exposure, the stored count is down-counted until 0. At the moment the count reaches 0, charge transfer from the image pickup device is initiated.

If the timing and rate of charge transfer remain unchanged, the duration T is equalized. By equalizing the duration T, the dark signal is excellently removed in the subtracting process.

Thus, in the removal operation of the dark signal, the timer counts and then down-counts the duration T that lasts from the resetting of the sensor to the end of charge transfer, so that a duration T in the exposure and another duration T in the dark exposure match.

The data that is transferred as the dark current is divided to 1/N by the 1/N circuit 51. When the memory 53 completes its read/write operation for all the cells, the data content in the memory 53 immediately after $D_{N1}$ is the dark current with its 1/N subtracted with respect to all the cells.

Such a subtraction is sequentially repeated by N cycles, namely repeated until $D_{NN}$ transfer. Thus, the dark current is removed. N cycles of subtraction thus reduces the effect of random noise.

The number N for the division operation is preferably a power of 2 because division operation is easily performed by bit shifting. Hardware for division operation is advantageously simplified.

When the N cycles of subtraction are complete, the data on the memory 53 is dark-current free data, and the system returns to standby state (step S22).

From the standpoint of system control, if a release or photographing trigger is accepted in the middle, the sequence of control will be interrupted. Thus, a release accept enabled duration and release accept disabled duration are set up as required.

Namely, the release accept enabled duration lasts until an input by the release button. Once the release button is pressed, the release accept disabled duration starts.

The transfer of the image data finally stored in the memory 53 to an external device is enabled in the initial state of the system. This means that if a transfer command is issued prior to the pressing of the release button, that command will be accepted. In this case, a release accept and external transfer accept are disabled until the external transfer has been completed.

Once the release button is pressed, the external transfer accept is disabled. When the $D_{NN}$ data as a result of subtractions is stored in the memory 53, the external transfer is again enabled. Once the external transfer is initiated, the external transfer accept is disabled again. When the external transfer is complete, the external transfer accept is enabled again.

Figure 11:
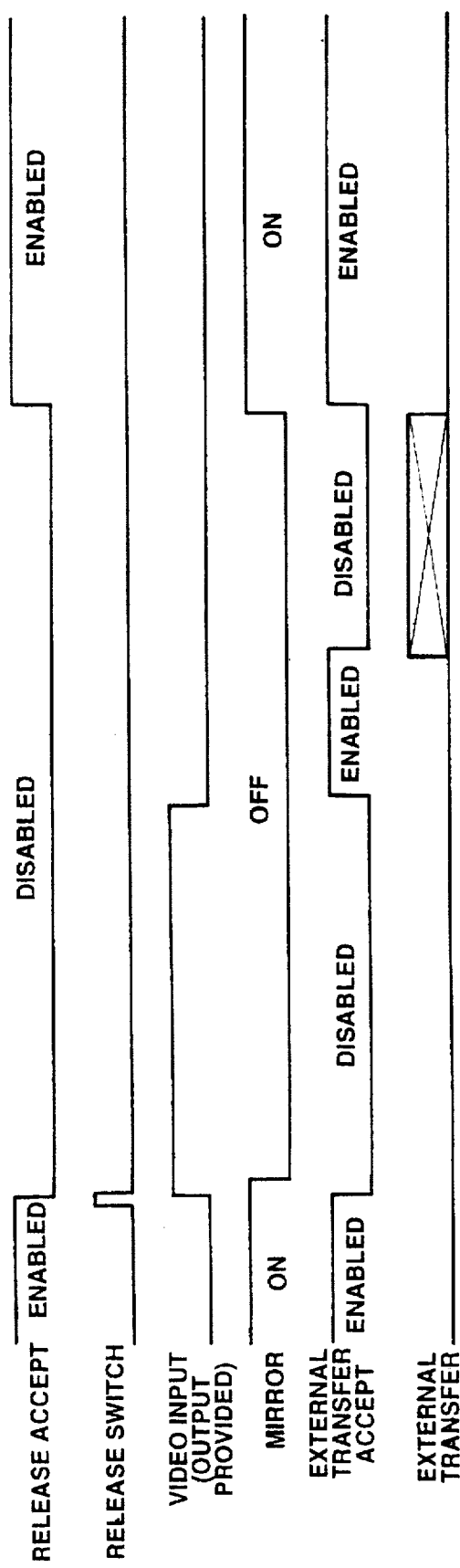
FIG. 11 is a timing diagram showing the sequence of the camera system covering the duration of FIG. 10 and some time before and after.

FIG. 11 is a timing diagram showing the sequence of the camera system covering the duration of FIG. 10 and some time before and after. In FIG. 11, video input (output provided) corresponds to the duration diagrammed in FIG. 10.

In the initial state of the system prior to the input by the release button, the release accept is enabled, the quick return mirror is on and the external transfer accept is enabled.

Once the release button is switched on, the release accept and the external transfer accept are disabled. In succession, the quick return mirror 7 is set to be off the optical path.

When the video input (output provided) duration ends, the external transfer accept is enabled and an actual external transfer is performed in response to a read command. In this case, no duplication of external transfer is allowed, and thus the external transfer accept is disabled.

All the data is transferred, and the external transfer accept and the release accept are enabled. The quick return mirror 7 is put back in the optical path again. In this case, the re-transfer to the external device is allowed.

When a re-transfer or release input takes place, the external transfer accept and release accept are disabled again.

In a series of sequences after the input of the release button, the quick return mirror 7 must be retracted both in the white balance sequence and the exposure sequence. In sequences other than these two sequences, the quick return mirror 7 may be left inserted in the optical path. If the quick return mirror 7 is set to be on in the release accept disabled duration, however, the operator may press the release button, because the object can be viewed through the finder system.

No technical problems arise even if the release button is pressed, because the release accept is disabled. However, the operator may think he took a picture by pressing the release button anyway.

To cope with this inconvenience, the quick return mirror 7 is retracted until an external transfer is performed once, namely, during the release accept disabled duration, so that no light flux from the object is guided through the finder system. This arrangement lets the operator recognize that he cannot currently photograph.

Whether the release accept is currently enabled or disabled is determined depending on whether or not the finder gives the image of the object. No extra means is required for this determination, and aborted photographing is thus prevented.

According to the embodiment of the present invention, as described above, immediately after the exposure sequence, the dark exposure sequence takes place under the same conditions as the exposure sequence. The dark exposure data is then subtracted from the exposure data, and noise due to dark current is thus efficiently reduced regardless of variations in the ambient temperature and charge storage time.

By repeating several times the dark exposure during which dark current is accumulated, the dark current component is more efficiently removed.

The operator cannot view the object through the finder in the release accept disabled duration, during which photographing attempt by the operator is thus restricted.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. An electronic image pickup apparatus comprising:
   an image pickup device;
   light-cutting mask means for controlling light from an object to the image pickup device so as to let the light in or cut the light off,
   memory means for temporarily storing output image data from said image pickup device, and
   computing and control means for determining an optimum exposure setting appropriate for photographing, and in connection with first image data corresponding to an output signal that is read from said image pickup device after photographing and second image data corresponding to an output signal that is read from said image pickup device during light cutoff, said computing and control means deriving final image data by subjecting to computation both said first and second image data, after making both said first and second image data on each cell match in time using said memory means.

2. The electronic image pickup apparatus according to claim 1, wherein said image pickup device is a two-dimensional sensor.

3. The electronic image pickup apparatus according to claim 2, wherein said two-dimensional sensor is an MOS-type internal amplification sensor.

4. The electronic image pickup apparatus according to claim 1, wherein said memory means stores the first image data photographed at a first timing intended by an operator, and
   in connection with the second image data read from said image pickup device at a second timing during light cutoff and third image data that is the first image data stored in and then read from said memory means, said computing and control means comprises subtracting means that assures time match between both the second and third data and subtracting the second image data from the third image data at a third timing.

5. The electronic image pickup apparatus according to claim 1, wherein said computing and control means causes the memory means to temporarily store an image data that is photographed at a first timing during light cutoff with the light-cutting mask means cutting off light, said image data obtained for a duration of time that has a predetermined relation with an effective exposure time derived from a photometric measurement made in advance, said computing and control means obtains light-permitted image data that is photographed at a second timing during light reception with an exposure time set to be in agreement with said duration and other exposure setting being appropriate, and said computing and control means comprises subtracting means that assures time match between image data during light reception and data that is once stored in and read from said memory means and subtracts the read image data from the image data during light reception.

6. The electronic image pickup apparatus according to claim 4 or 5, wherein the image data that is obtained through subtraction operation is written onto the same memory means.

7. The electronic image pickup apparatus according to claim 4 or 5, wherein said computing and control means reads the output signal from the image pickup device during light cutoff on N cycles (where N is a natural number), stores the data corresponding to the output signal at each cycle in the memory means, averages N sets of data to obtain an average value, and uses the average value as the image data during light cutoff, whereby a random noise component contained in the output signal read during light cutoff is reduced.

8. The electronic image pickup apparatus according to claim 7, wherein said N is a power of 2, whereby division operation of the dividing means is performed by bit shifting.

9. The electronic image pickup apparatus according to claim 1 or 4, wherein said computing and control means is provided with dividing means that divides the value of the image output data during light cutoff to 1/N (N is a natural number), whereby, in connection with a process cycle starting with reading at a first timing the image data stored in the memory means, then subtracting from the read data divided data given by the dividing means, and ending with writing back a result from the subtraction onto the memory means, the image output data is sequentially obtained from the output signal of the image pickup device on N cycles during light cutoff, the resulting N sets of data are subjected to N process cycles and the result is the final image data of reduction for random noise component contained in the read out signal during light cutoff.

10. The electronic image pickup apparatus according to claim 9, wherein said N is a power of 2, whereby division operation of the dividing means is performed by bit shifting.

11. The electronic image pickup apparatus according to claim 1, wherein the light-cutting mask means is a mechanical exposure control shutter.

12. The electronic image pickup apparatus according to claim 6, wherein said mechanical exposure control shutter is a between lens shutter that performs lens aperture action.

13. The electronic image pickup apparatus according to claim 11, wherein said mechanical exposure control shutter is a focal plane shutter.

14. The electronic image pickup apparatus according to claim 13, wherein the image data is extracted after said amplification factor of each circuit of the channel is determined so that the outputs of the R-channel, G-channel, and B-channel are equalized at level.

15. The electronic image pickup apparatus according to claim 1, wherein said light-cutting mask means is a movable optical mirror that reflects the light directed thereto from an object toward a finder system.

16. The electronic image pickup apparatus according to claim 15, wherein guiding of light coming in through a taking lens from the object to the finder system via the optical mirror is disabled from a commencement of photographing until said final image data is derived from said computing and control means or until at least one cycle of data transfer from the memory means is completed.

17. The electronic image pickup apparatus according to claim 1, wherein said computing and control means is so constructed to include means so that a timing control and routine control to derive the first image data from the corresponding output signal of said image pickup device during light cutoff are set to be in agreement with a timing control and routine control to derive the second image data from the corresponding output signal of said image pickup device during light reception.

18. The electronic image pickup apparatus according to claim 17, wherein said computing and control means comprises second memory means for storing a data representing a time duration for a photoelectric conversion of said image pickup device during light reception, whereby said timing control and routine control during light cutoff are performed based on the stored data in said second memory means.

19. The electronic image pickup apparatus according to claim 1, wherein said computing and control means is so constructed to include means that, by issuing a transfer request command to an external device connected therewith, reads the output image data to be transferred to said external device from the memory means at a transfer rate slower than a mentioned output rate of said image pickup device.

20. The electronic image pickup apparatus according to claim 1 comprising:

a moveable optical mirror for routing light to a finder system, disposed in an optical path along which light from the object passes a taking lens and reaches the image pickup device, control means for switching an optical path of the light from the object, from one leading to the finder system to another leading to the image pickup device, in response to a photographing trigger signal, a focal plane shutter with exposure control capability disposed in an optical path in front of the image pickup device, photometric means for making photometric measurements of light coming in through the taking lens from the object, in order to determine optical aperture value and the shutter speed of the focal plane shutter, and a white diffuser having a predetermined transmittance, mountable in an optical path portion between the optical mirror and the focal plane shutter, whereby an amplification factor for an output signal of said image pickup devise is determined and set thereto, prior to photographing, according to an aperture setting determined based on an output from the photometric means and an output level of the image pickup device that is exposed to the light transmitted through the white diffuser, and then photographing is performed under a condition of a set amplification factor.

21. The electronic image pickup apparatus according to claim 20, whereby in the course of converting incident light of RGB spectral characteristics by said image pickup devices into electrical signals, an exposure setting is determined after a commencement of a photographing trigger signal, the white diffuser is put into the optical path, the amplification factor of the circuitry of the apparatus is determined and set thereto so that the output levels of the R-channel, G-channel and B-channel are equalized at level, and then photographing is performed under a condition of said amplification factor set.

22. The electronic image pickup apparatus according to claim 20, whereby both the optical mirror and the white diffuser are mounted between the taking lens and said image pickup device in a manner that allows both the optical mirror and the white diffuser to pivot up and down and an orbit of pivotal motion of the optical mirror is partly superimposed in space on an orbit of pivotal motion of the white diffuser, and further provided is second control means which control sequentially three states, namely, a first state in which the optical mirror guides the light from the object to the finder system, a second state in which the light transmitted through the white diffuser is guided to the image pickup device, and a third state in which both the optical mirror and the white diffuser are retracted to allow light from an object to be guided directly to the image pickup device.

23. A method for operating an electronic image pickup device having an array of cells, each for storing a pixel of an image, to remove noise from the information derived therefrom, comprising the steps of:

(a) exposing the pickup device to light from an object to be photographed;

(b) providing an optimum exposure setting from data obtained during step (a);

(c) exposing the cells of the pickup device to light from the object being observed using optical means having an exposure setting obtained during step (b);

(d) storing output image data obtained from cells of the pickup device obtained in step (c);

(e) blocking light from the object being observed from reading the pickup device;

(f) determining a dark current developed by cells of the pickup device when blocked from receiving light during step (e); and (g) subtracting, in a cell-by-cell manner, data developed by each cell of the pickup device during step (f) from the data of a matching cell stored in step (d).

24. The method of claim 23 wherein step (a) further includes inserting a white diffuser in a light path leading to the pickup device.

25. The method of claim 23 wherein step (c) further comprises measuring an elapsed time the pickup device is exposed to light passing through the white diffuser; and step (f) further includes determining a dark current over a time interval equal to the elapsed time measured during step (c).

* * * * *

UNITED STATES PATENT AND TRADEMARK OFFICE
CERTIFICATE OF CORRECTION

PATENT NO. : 5,729,288
DATED : March 17, 1998
INVENTOR(S) : Saito

It is certified that error appears in the above-identified patent and that said Letters Patent is hereby corrected as shown below:

Col. 1, line 38, after "possible" insert --to--.

Col. 14, line 47, Claim 12, delete "claim 6" and insert --Claim 11--.

Signed and Sealed this

Twentieth Day of April, 1999

Attest:

Q. TODD DICKINSON

*Attesting Officer*  *Acting Commissioner of Patents and Trademarks*